United States Patent [19]

Sato et al.

[11] Patent Number: 5,775,362
[45] Date of Patent: Jul. 7, 1998

[54] FUEL-EFFUSION PREVENTION VALVE

[75] Inventors: Tadayoshi Sato, Chita-gun; Shinichi Nakayama; Masahiro Mochizuki, both of Okazaki; Yasushi Miura, Toyoake; Kazuo Miyazato, Kariya, all of Japan

[73] Assignee: Aisin Seiki Kabushiki Kaisha, Kariya, Japan

[21] Appl. No.: 866,298

[22] Filed: May 30, 1997

[30] Foreign Application Priority Data

May 30, 1996 [JP] Japan .................. 8-136876

[51] Int. Cl.$^6$ .................................. F16K 24/04
[52] U.S. Cl. ............................... 137/202; 137/43
[58] Field of Search ......................... 137/43, 202

[56] References Cited

U.S. PATENT DOCUMENTS

| | | | |
|---|---|---|---|
| 4,050,471 | 9/1977 | Anhegger et al. | 137/43 X |
| 4,655,238 | 4/1987 | Szlaga | 137/43 |
| 4,781,218 | 11/1988 | Mori et al. | 137/202 |

*Primary Examiner*—Gerald A. Michalsky
*Attorney, Agent, or Firm*—Hazel & Thomas, P.C.

[57] ABSTRACT

A fuel-effusion prevention valve includes a first housing member having an evaporation passage, a first engaging portion and a first cylindrical portion, and a second housing member having a partition portion, a communicating passage, a second engaging portion and a second cylindrical portion. The first cylindrical portion is formed so as to extend axially from the first engaging portion, and its diameter is smaller than that of the second engaging portion. The second cylindrical portion is formed so as to extend axially from the second engaging portion. A floating valve is disposed in a chamber so as to be able to open and close the valve hole in response to its buoyancy due to fuel flowing into the second chamber through the communicating passage. The first cylindrical portion is fused with the second cylindrical portion. A circular seal member is fitted into an installation hole formed on the fuel tank and its inner hole is fitted onto the outer circumferential surface of the first cylindrical portion.

4 Claims, 3 Drawing Sheets

FUEL-EFFUSION PREVENTION VALVE

BACKGROUND OF THE INVENTION

1. Field of the Invention

The present invention relates to a fuel-effusion prevention valve, and more particularly to a fuel-effusion prevention valve which is fitted into an installation hole formed on a fuel tank through a circular seal member.

2. Description of the Prior Art

Fuel such as gasoline and so on for a vehicle as an automobile is usually stored in a fuel tank and is supplied to a combustion chamber of a combustion engine as occasion demands. A part of the fuel stored in the fuel tank evaporates under the normal temperature and the normal pressure and becomes evaporated-fuel. Because of this, if the fuel tank is kept under the sealed condition, the pressure in the fuel tank is increased by the evaporated-fuel. In this connection, if the evaporated-fuel is opened into the atmosphere, the atmosphere is contaminated. Therefore, in general, a fuel-effusion prevention valve is disposed in the fuel tank. The fuel-effusion prevention valve is normally in the open condition so as to allow the fuel tank to operatively connect with a charcoal canister for adsorbing the evaporated fuel. When the fuel level in the fuel tank rises and the vehicle makes a turn and so on, the fuel-effusion prevention valve changes to the closed condition and prevents the fuel from effusing. The evaporated-fuel adsorbed in the charcoal canister is supplied to an intake manifold of the combustion engine.

A conventional fuel-effusion prevention valve of this kind is disclosed in, for example, Japanese patent application laid-open publication No. 62 (1987)-242187. This fuel-effusion prevention valve includes a resinous cylindrical housing having first and second engaging portions each of which is formed on its outer circumferential portion by enlarging the outer diameter, a partition portion that axially defines first and second chambers in its interior, a valve hole that is formed on the partition portion so as to connect between the first and second chambers, an evaporation passage that connects between the first chamber r and a filter and a communicating passage which communicates between the second chamber and an interior of the fuel tank and a floating valve which is disposed in the second chamber so as to be able to open and close the valve hole. The floating valve closes the valve hole by its buoyancy due to fuel flown in the second chamber through the communicating passage and prevents the fuel from effusing into the evaporation passage. A circular seal member is fitted into an installation hole which is formed on an upper portion of the fuel tank so that its outer circumferential portion seals up an inner circumferential portion of the installation hole. The fuel-effusion prevention valve is-fitted from the outside of the fuel tank into an inner hole of the circular seal member so that the outer circumferential surface of the housing between the first and second engaging portions is fluid-tightly contacted with the inner circumferential portion of the seal member.

In the above mentioned prior fuel-effusion prevention valve, the valve is prevented from axially moving toward the outside of fuel tank by the contact between the seal member and the second engaging portion. However, this second engaging portion becomes an under-cut portion at the molding of the housing. The housing is molded by two molds which are separated in the radial direction of the housing. As a result, a parting line that is formed on the connecting portion of two molds is located on the outer circumferential surface of the housing between the first and second engaging portions. However, the sealing performance between the housing and the seal member deteriorates along the parting line and the slipping off of the molds occurs. Accordingly, there is a danger of the fuel-effusion prevention valve deteriorating.

SUMMARY OF THE INVENTION

It is, therefore, an object of the present invention to provide an improved fuel-effusion prevention valve which overcomes the above drawbacks.

It is another object of the present invention to provide an improved fuel-effusion prevention valve which can ensure the sealing performance between the housing and the seal member.

In order to achieve these objectives, there is provided an improved fuel-effusion prevention valve which includes a resinous cylindrical housing having first and second engaging portions each of which is formed on its outer circumferential portion, a partition portion which axially defines first and second chambers in its interior, a valve hole which is formed on the partition portion so as to communicate between the first and second chambers, an evaporation passage which communicates between the first chamber and a filter and a communicating passage which communicates between the second chamber and an interior of a fuel tank, a floating valve disposed in the second chamber so as to be able to open and close the valve hole in response to its buoyancy due to fuel flowing into the second chamber through the communicating passage and a circular seal member that is fitted into an installation hole formed on the fuel tank and whose inner hole is fitted onto the outer circumferential surface of the housing between the first and second engaging portions. The housing includes a first housing member having the evaporation passage, the first engaging portion and a first cylindrical portion that is formed so as to extend axially from the first engaging portion and whose diameter is smaller than that of the second engaging portion and a second housing member having the partition portion, the communicating passage, the second engaging portion and a second cylindrical portion that is formed so as to extend axially from the second engaging portion. The outer circumferential portion of the second cylindrical portion and the inner circumferential portion of the first cylindrical portion are fused to each other.

BRIEF DESCRIPTION OF THE DRAWINGS

Additional objects and advantages of the present invention will become more apparent from the following detailed description of preferred embodiments thereof when considered with reference to the attached drawings, in which.

DESCRIPTION OF THE PREFERRED EMBODIMENTS

A fuel-effusion prevention valve in accordance with preferred embodiments of the present invention will be described with reference to attached drawings.

Figure 1:
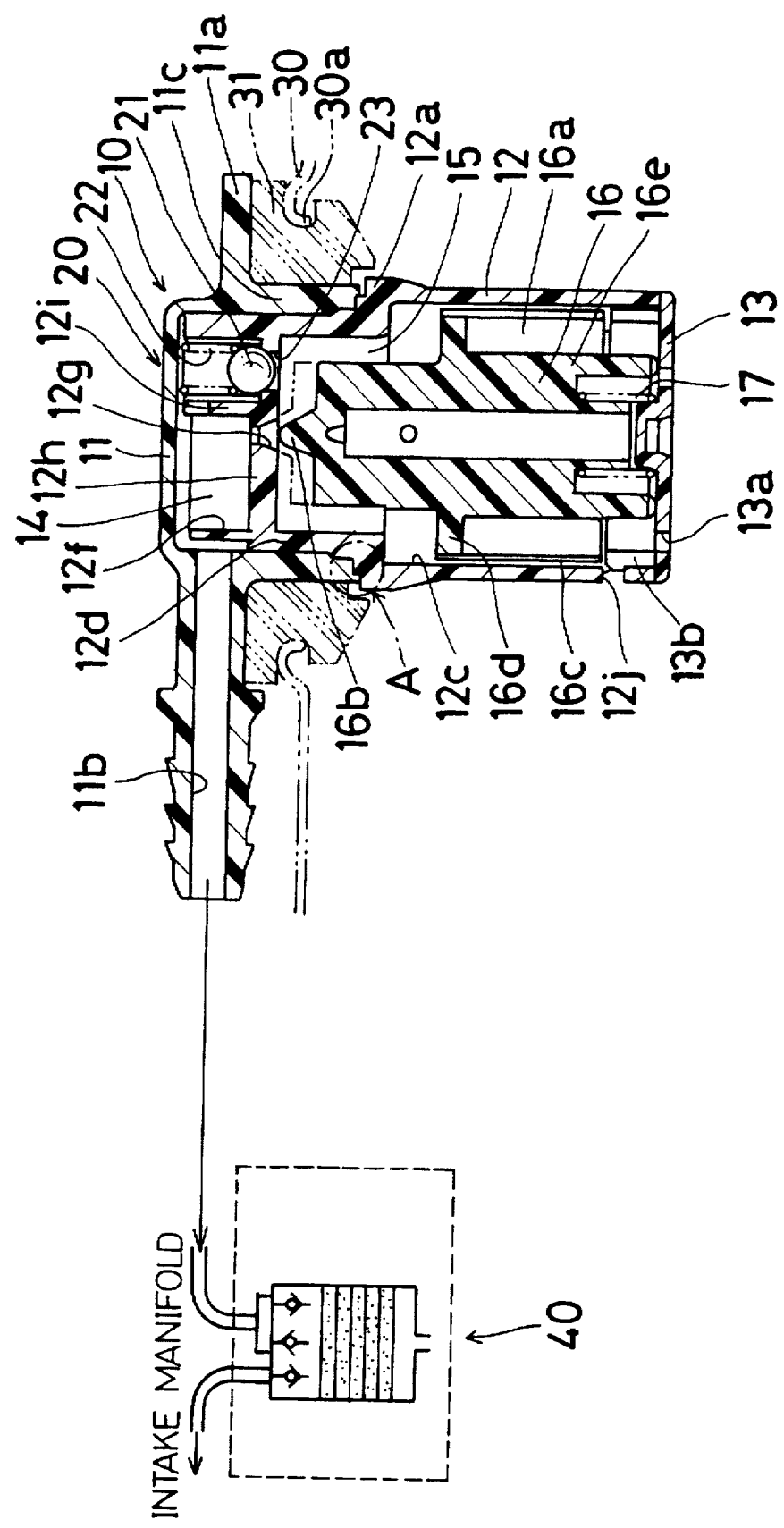
FIG. 1 shows a sectional view of a first embodiment of a fuel-effusion prevention valve in accordance with the present invention.

FIG. 1 shows a first embodiment of a fuel-effusion prevention valve in accordance with the present invention. Referring to FIG. 1, the fuel-effusion prevention valve 10 includes a resinous first housing member 11 and a resinous second housing member 12. The first housing member 11 has a cylindrical shape whose first end is opened and whose other or second end is closed. A flange portion 11a which corresponds to a first engaging portion of the present invention is formed on the outer circumference of the first housing member 11. At the first end of the first housing member 11, a first cylindrical portion 11c that extends from the flange portion 11a toward the first end in the axial direction is formed. The second housing member 12 has a cylindrical shape whose first end is opened and whose other or second end is closed. A stopper portion 12a which corresponds to a second engaging portion of the present invention is formed on the outer circumference of the second housing member 12 by increasing the outer diameter. A taper portion is formed on one side of the portion 12a located at the first end side of the second housing 12. A vertical portion that is vertically positioned with respect to the axial direction of the second housing member 12 is formed on the other side located at the second end side of the second housing member 12. The diameter of the stopper portion 12a is larger than that of the first cylindrical portion 11c.

Figure 2:
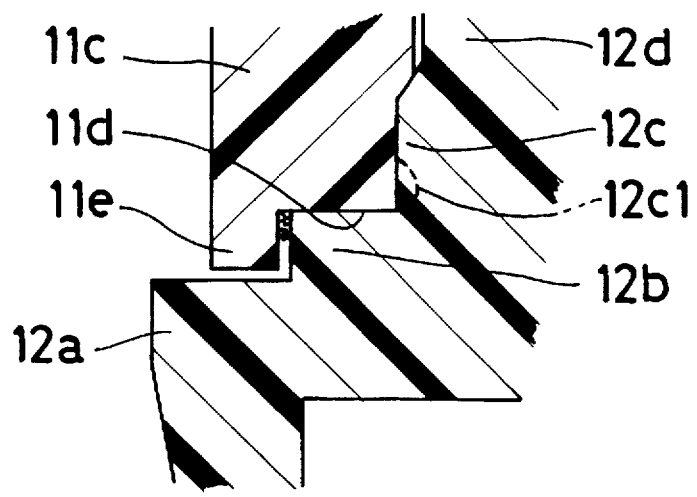
FIG. 2 shows an enlarged view of an A portion of FIG. 1.

A resinous closed member 13 having a plurality of engaging nail portions 13b that extend in the axial direction is fitted into the opening of the one end of the second housing member 12. The engaging nail portions 13h are elastically fitted into a plurality of engaging holes 12j which are formed on the outer circumference of the second housing member 12, whereby the closed member 13 is fixed to the first end of the second housing member 12. At the second end side of the second housing member 12, a second cylindrical portion 12d which extends from the stopper portion 12a toward the other end in the axial direction is formed and is fitted into the first cylindrical portion 11c of the first housing member 11. As shown in FIG. 2, on the outer circumference of the second cylindrical portion 12d, a stepping portion 12b which is adjacent to the stopper portion 12a is formed thereon. The diameter of the stepping portion 12b is larger than that of the second cylindrical portion 12d and is smaller than that of the stopper portion 12a and the first cylindrical portion 11c. On the end portion 11e of the first cylindrical portion 11c that is opposite to the vertical portion of the stopper portion 12a, a circular groove portion 11d in which the stepping portion 12b is received is formed thereon. Further, on the outer circumference of the second cylindrical portion 12d, a fusing portion 12c that is adjacent to the stepping portion 12b and whose diameter is larger than that of the second cylindrical portion 12d is formed thereon. A circular groove 12cl is formed between the fusing portion 12c and the stepping portion 12b. The fusing portion 12c is fused by ultrasonic fusing and so on under the condition in which the vertical portion of the stepping portion 12b contacts with the circular groove portion 11d in the axial direction and thereby, the first and second housing members 11 and 12 are connected each other.

A partition portion 12h that defines axially first and second chambers 14 and 15 in the inner space formed by the first and second housing members 11 and 12 and the closed member 13 is formed on the inner circumference of the second cylindrical portion 12d of the second housing member 12. The first chamber 14 is communicated with a well-known charcoal canister 40 (filter) through an evaporation passage 11b that is formed on the first housing member 11. Further, the first chamber 14 is communicated with the second chamber 15 through a valve hole 12g that is formed on the partition portion 12h. In the second chamber 15, a floating valve 16 is disposed so as to be movable in the axial direction. The floating valve 16 has a disk portion 16d, a valve portion 16b that is formed on a center of one side of the disk portion 16d and which opens and closes the valve hole 12g, a cylindrical portion 16e that extends from the other side of the disk portion 16d toward the closed member 13 in the axial direction and a plurality of rib portions 16a which are radially formed on the outer circumference of the cylindrical portion 16e. On the outer circumference of each of the rib portions 16a, a guide portion 16c which guides the floating valve 16 in the second chamber 15 in the axial and radial directions is formed. A spring 17 is interposed between the end of the cylindrical portion 16e and the closed member 13 and normally urges the floating valve 16 toward the closing position. The closed member 13 is provided with a plurality of communicating holes 13a.

A communicating hole 23 which connects between the first and second chambers 14 and 15 and which is in parallel with the valve hole 12g is formed on the partition member 12h. A cylindrical guiding portion 12i is formed on the partition portion 12h so as to surround the opening of the first chamber 14 side of the communicating hole 23. A spherical valve member 21 is disposed in the guiding portion 12i so as to be movable in the axial direction and so as to be able to close the communicating hole 23. A spring 22 is interposed between the spherical valve member 21 and the closed wall of the first housing member 11 and thereby, the spherical valve member 21 normally closes the communicating hole 23. The spring 22 and the spherical valve member 21 constitutes a relief valve 20. A notch portion is formed on a part of the guiding portion 12i and thereby, the communication between the second chamber 15 and the evaporation passage 11b through the communicating hole 23 and the first chamber 14 is ensured. Further, a projecting portion 12f which is projected into the first chamber 14 while maintaining a predetermined clearance against the closed wall and the inner circumference wall of the first chamber 14 is formed on the partition portion 12h.

A circle seal member 31 is fitted into an installation hole 30a that is formed on an upper portion of a fuel tank 30 so that its outer circumferential portion seals up an inner circumferential portion of the installation hole 30a. The fuel-effusion prevention valve 10 is inserted from the outside of the fuel tank 30 into the inner circumference (inner hole) of the seal member 31 along the taper portion of the stopper portion 12a and the outer circumferential surface of the first cylindrical portion 11c is fluid-tightly fitted into the inner circumference of the seal member 31.

The above-described first embodiment operates as follows:

The fuel-effusion prevention valve 10 is in a condition shown in FIG. 1 under the normal condition. In this normal condition, the interior of the fuel tank 30 communicates with the charcoal canister 40 through the communicating holes 13a of the closed member 13, the second chamber 15, the valve hole 12g, the first chamber 14 and the evaporation passage 11b. Thereby, the pressure in the fuel tank 30 is prevented from rising and the evaporated-fuel is supplied to an intake manifold of the engine (not shown) through the charcoal canister 40. When the fuel level in the fuel tank 30 varies at the turning of the vehicle and so on and the fuel flows into the second chamber 15 through the communicating holes 13a of the closed member 13, the floating valve 16 rises by the urging force of the spring 17 and buoyancy due to fuel flowing into the second chamber 15 through the communicating holes 13a and the valve portion 16b closes the valve hole 12g. Thereby, the fuel is prevented from effusing into the first chamber 14 and the evaporation passage 11b. At this time, it is prevented by the disk portion 16d of the floating valve 16 that the fuel reaches the valve hole 12g beyond the floating valve 16. When the fuel level in the fuel tank 30 is suddenly varied, even though the fuel reaches the valve hole 12g beyond the disk portion 16d and flows in the first chamber 14, the fuel is prevented from flowing into the evaporation passage 11b by the projection portion 12f.

When the valve hole 12g is blocked up by a foreign object in the fuel or when the floating valve 16 remains in the closing condition, the pressure in the fuel tank 30 increases. At this time, when the pressure in the fuel tank becomes higher than a predetermined level, the relief valve 20 opens and the second chamber 15 communicates with the first chamber 14 through the communicating hole 23. Thereby, the pressure in the fuel tank 30 is prevented from increasing excessively.

As mentioned above, in this embodiment, the first and second housing members 11 and 12 are fused at the fusing portion 12c by ultrasonic fusing and so on. Thereby, since a portion which becomes under-cut portion in the axial direction does not exist on the first housing member 11, the first housing member 11 is molded by two molds (not shown) which are not separated in the radial direction, but in the axial direction. Accordingly, a parting line is not generated on the outer circumference of the first cylindrical portion 11c which functions as a sealing surface against the inner circumference of the seal member 31. As a result, the sealing performance between the first cylindrical portion 11c and the seal member 31 is prevented from deteriorating along a parting line, and also fusing waste and slipping off of the molds are prevented. Therefore, the functionality of the fuel-effusion prevention valve is maintained.

Furthermore, since the circular groove 12cl is formed on the second cylindrical portion 12d and the circular groove 11d is formed on the end of the first cylindrical portion 11c, fusing waste generated at the fusing stays in the circular groove 12cl and in the space between the stepping portion 12b and the circular groove 11d, and does not project into the outer circumference of the first cylindrical portion 11c. Therefore, the sealing performance between the inner circumference of the seal member 31 and the outer circumference of the first cylindrical portion 11c are ensured.

Furthermore, since the first and second housing members 11 and 12 are fused to each other, the scattering of measurements between the partition portion 12h and the closed wall of the first housing member 11 is restrained. Therefore, the load of the spring 22 is stabilized and thereby, the function of the relief valve 20 is stabilized.

Figure 3:
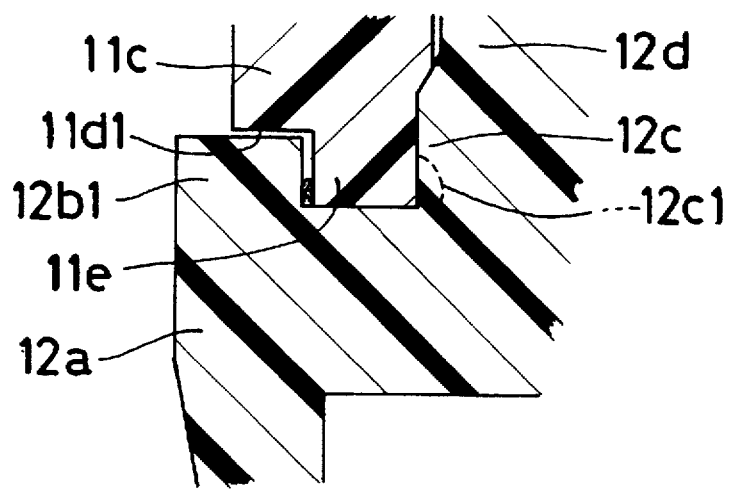
FIG. 3 shows a modified embodiment of FIG. 2.

FIG. 3 shows a modified embodiment of the A portion of FIG. 1. In FIG. 3, the same parts as compared with FIG. 1 are identified by the same reference numerals. Referring to FIG. 3, a circular projecting portion 12bl is formed on the outer circumferential edge portion of the vertical portion of the stopper portion 12a. On the end portion 11e of the first cylindrical portion 11c which is opposite to the vertical portion of the stopper portion 12a, a circular groove portion 11dl in which the projecting portion 12bl is received is formed thereon. In this modified embodiment, fusing waste generated at fusing stays in the circular groove 12cl and in the space between the projecting portion 12bl and the circular groove 11dl and does not project into the outer circumference of the first cylindrical portion 11c. Therefore, according to this modified embodiment, it is possible to obtain the same effects as the first embodiment shown in FIG. 2.

Figure 5:
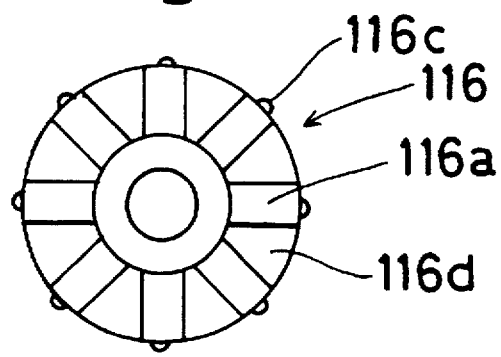
FIG. 5 shows a bottom view of a floating valve of FIG. 4.
Figure 4:
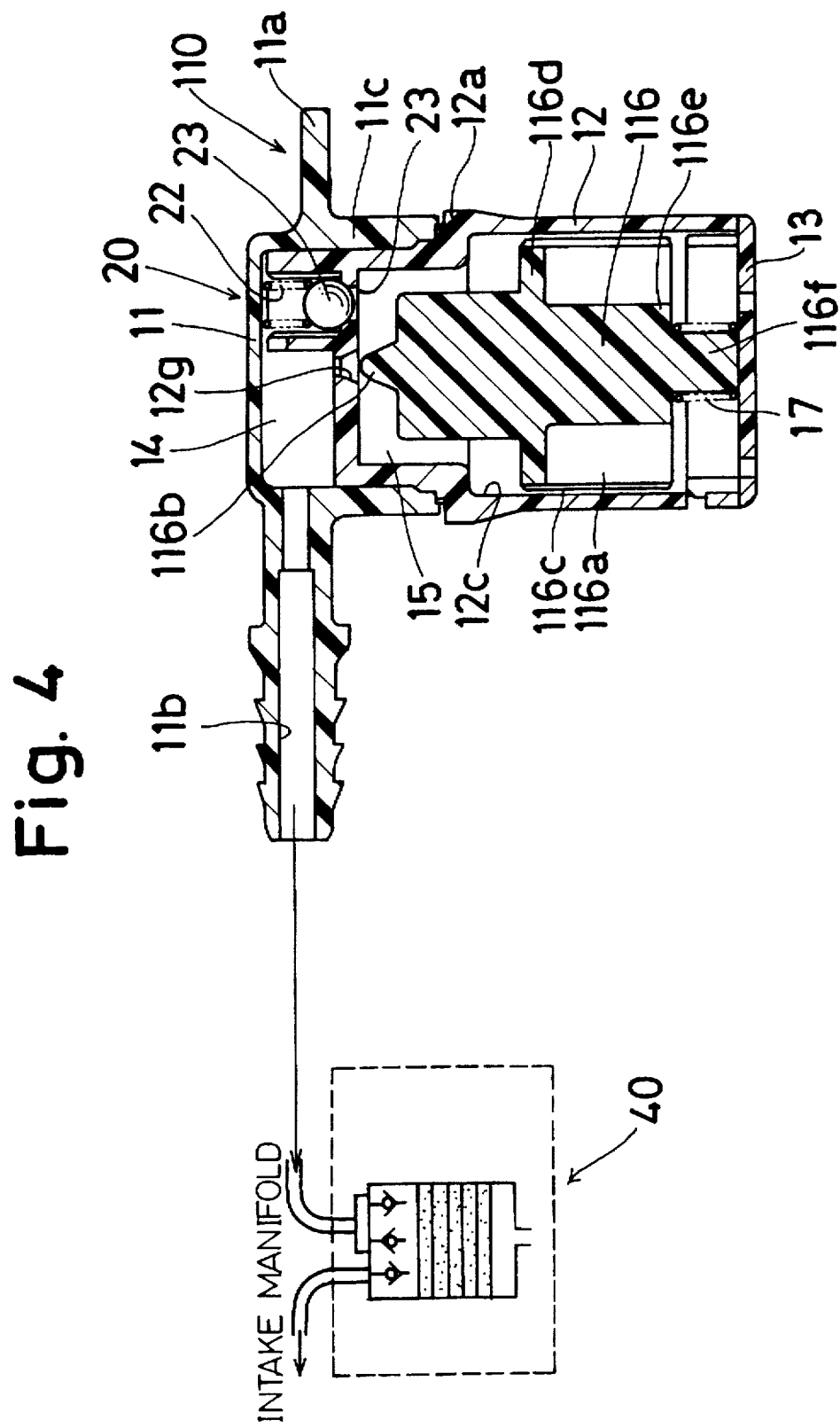
FIG. 4 shows a sectional view of a second embodiment of a fuel-effusion prevention valve in accordance with the present invention.

FIG. 4 shows a second embodiment of the present invention. In FIG. 4, the same parts as compared with FIG. 1 are identified by the same reference numerals. Referring to FIG. 4, a floating valve 116 does not have a hollow portion in which air can stay in comparison with the above first embodiment. In this embodiment, as shown in FIGS. 4 and 5, the floating valve 116 includes a disk portion 116d, a valve portion 116b which is formed on a center of one side of the disk portion 116d and which opens and closes the valve hole 12g, a columnar portion 116e that extends from the other side of the disk portion 116d toward the closed member 13 in the axial direction and a plurality of rib portions 116a that are radially formed on the outer circumference of the columnar portion 116e. On the outer circumference of each of the rib portions 116a, a guide portion 116c that guides the floating valve 116 in the second chamber 15 in the axial and radial directions is formed. A projecting portion 116f is formed on the end of the columnar portion 116e and a spring 17 is disposed around the projecting portion 116e.

According to the second embodiment, it is possible to obtain the same effects as the above first embodiment. Furthermore, since the floating valve 116 does not have a cylindrical shape and does not have the hollow portion in which air can stay, variations in the buoyancy due to changes in the position of the floating valve 116 are prevented. As a result, decreases in the speed for closing the floating valve 116 and poor closing conditions of the valve hole caused by the variations in the buoyancy are prevented, and fuel flowing into the first chamber 14 through the valve hole 12g is prevented. Since the other structures are the same as the first embodiment, a description thereof is omitted.

The principles, preferred embodiments and modes of operation of the present invention have been described in the foregoing description. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A fuel-effusion prevention valve, comprising:

a resinous cylindrical housing having first and second engaging portions each formed on an outer circumferential portion of said housing, a partition portion which axially defines first and second chambers in an interior of said housing, a valve hole formed on the partition portion so as to communicatively connect the first and second chambers, an evaporation passage which communicatively connects the first chamber with a filter and a communicating passage which communicatively connects the second chamber with an interior of a fuel tank, a floating valve disposed in the second chamber as to open and close the valve hole in response to buoyancy due to fuel flowing into the second chamber through the communicating passage and, a circular seal member fitted into an installation hole formed on the fuel tank, the seal member having an inner hole defined on the outer circumferential surface of the housing between the first and second engaging portions, wherein the housing further includes a first housing member having the evaporation passage, the first engaging portion and a first cylindrical portion formed so as to extend axially from the first engaging portion and with a diameter smaller than that of the second engaging portion, a second housing member having the partition portion, the communicating passage, the second engaging portion and a second cylindrical portion formed so as to extend axially from the second engaging portion, the outer circumferential portion of the second cylindrical portion and the inner circumferential portion of the first cylindrical portion being fused to each other.

2. A fuel-effusion prevention valve as claimed in claim 1, wherein a stepping portion with a diameter larger than that of the second cylindrical portion and smaller than that of the second engaging portion is formed on the second cylindrical portion and a circular groove in which the stepping portion is received is formed on an end of the first cylindrical portion.

3. A fuel-effusion prevention valve as claimed in claim 1, wherein a communicating hole communicatively connects the first and second chambers and that is in parallel with the valve hole is formed on the partition portion, and a relief valve that normally closes the communicating hole and opens the communicating hole when the pressure in the second chamber becomes higher than a predetermined value is disposed in the first chamber.

4. A fuel-effusion prevention valve as claimed in claim 1, wherein the floating valve includes a disk portion, a valve portion formed on a center of a first side of the disk portion and that opens and closes the valve hole, a columnar portion that extends from a second side of the disk portion in the axial direction, and a plurality of rib portions radially formed on an outer circumference of the columnar portion.

* * * * *